United States Patent [19]
Matsumoto

[11] Patent Number: 4,586,135
[45] Date of Patent: Apr. 29, 1986

[54] IMAGE SIGNAL-PROCESSING SYSTEM BASED ON SYNTHETIC APERTURE TECHNIQUE

[75] Inventor: Kenzo Matsumoto, Tokyo, Japan

[73] Assignee: Tokyo Shibaura Denki Kabushiki Kaisha, Kawasaki, Japan

[21] Appl. No.: 551,934

[22] Filed: Nov. 15, 1983

[30] Foreign Application Priority Data

Nov. 20, 1982 [JP] Japan .................. 57-203847

[51] Int. Cl.$^4$ .................. G06F 15/58; G06G 7/60; G01N 29/00
[52] U.S. Cl. .................. 364/414; 364/417; 73/602; 73/603; 73/625; 128/660
[58] Field of Search .................. 364/414, 417; 73/602, 73/603, 625; 128/660; 378/36, 98, 99; 352/111, 112; 367/8, 11

[56] References Cited

U.S. PATENT DOCUMENTS

| | | | |
|---|---|---|---|
| 3,885,224 | 5/1975 | Klahr | 340/5 MP |
| 3,889,226 | 6/1975 | Hildebrand | 367/8 |
| 3,942,150 | 3/1976 | Booth et al. | 340/5 H |
| 3,975,704 | 8/1976 | Klein | 340/3 F |
| 4,099,416 | 7/1978 | Niklas | 73/602 |
| 4,234,937 | 9/1980 | Eggleton et al. | 367/11 |
| 4,275,595 | 6/1981 | Hassler | 73/606 |
| 4,320,660 | 3/1982 | Tancrell | 73/626 |
| 4,430,898 | 2/1984 | Trimmer et al. | 73/624 |

FOREIGN PATENT DOCUMENTS

| | | |
|---|---|---|
| 55-20423 | 2/1980 | Japan . |
| 2072847 | 10/1981 | United Kingdom . |

OTHER PUBLICATIONS

Acoustical Imaging, vol. 10, 1982, pp. 669–692, Plenum Press, New York, USA; S. Bennett et al.
IEEE Transactions on Sonics and Ultrasonics, vol. SU-27, No. 5, Sep. 1980, pp. 249–252, New York; E. E. Hundt et al.
Acoustical Imaging, p. 39, "A Digital Synthetic Focus Acoustic Imaging System", P. D. Corl et al, 1980, Plenum Publishing Company.

*Primary Examiner*—Jerry Smith
*Assistant Examiner*—Charles B. Meyer
*Attorney, Agent, or Firm*—Oblon, Fisher, Spivak, McClelland & Maier

[57] ABSTRACT

An apparatus for reconstructing an image signal of a foreground subject wherein a probe having a plurality of transducers for scanning a foreground subject by radiation, such as an ultrasonic beam, is connected to a phase detector through a receiver. An electrical signal corresponding to a wave reflected from the foreground subject is phase-detected by a phase detector. At least one resultant hologram signal is subjected to the A/D conversion to be stored in a buffer memory. A processing unit causes the hologram signal to be read out of the buffer memory, carries out the convolution integration of the hologram signal and the corresponding kernel function data by the synthetic aperture technique, thereby producing a reconstructed image signal. The processing unit further carries out the nonlinear compression of the amplitude of the hologram signal before the convolution integration and performs the nonlinear expansion of the amplitude of an image signal after the convolution integration.

15 Claims, 5 Drawing Figures

BEFORE AND AFTER COMPRESSION

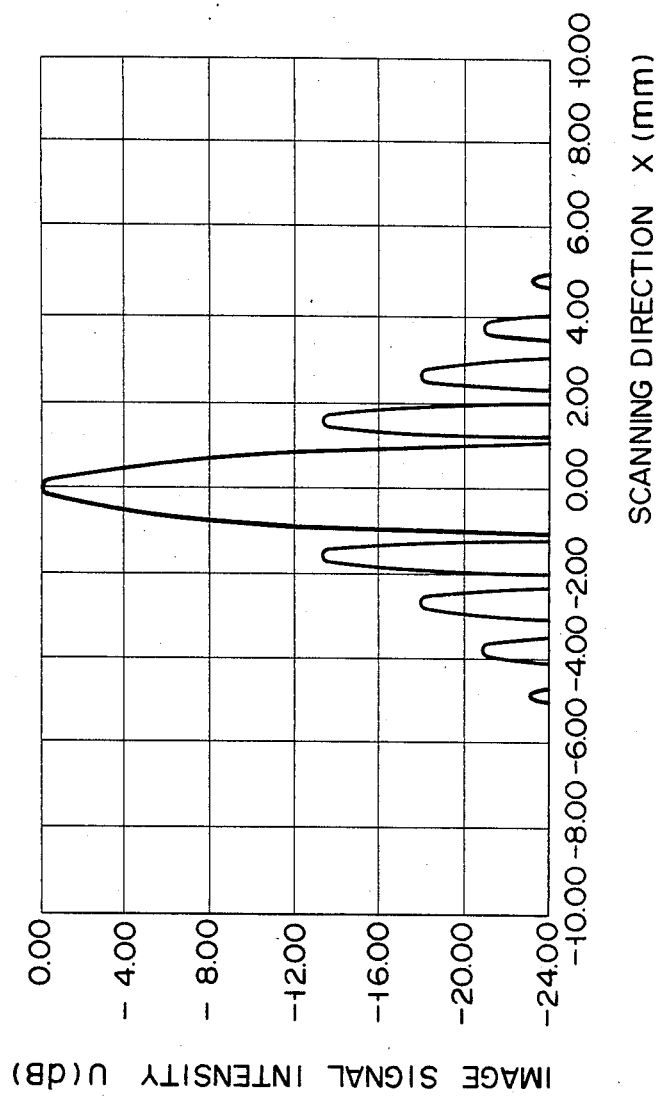

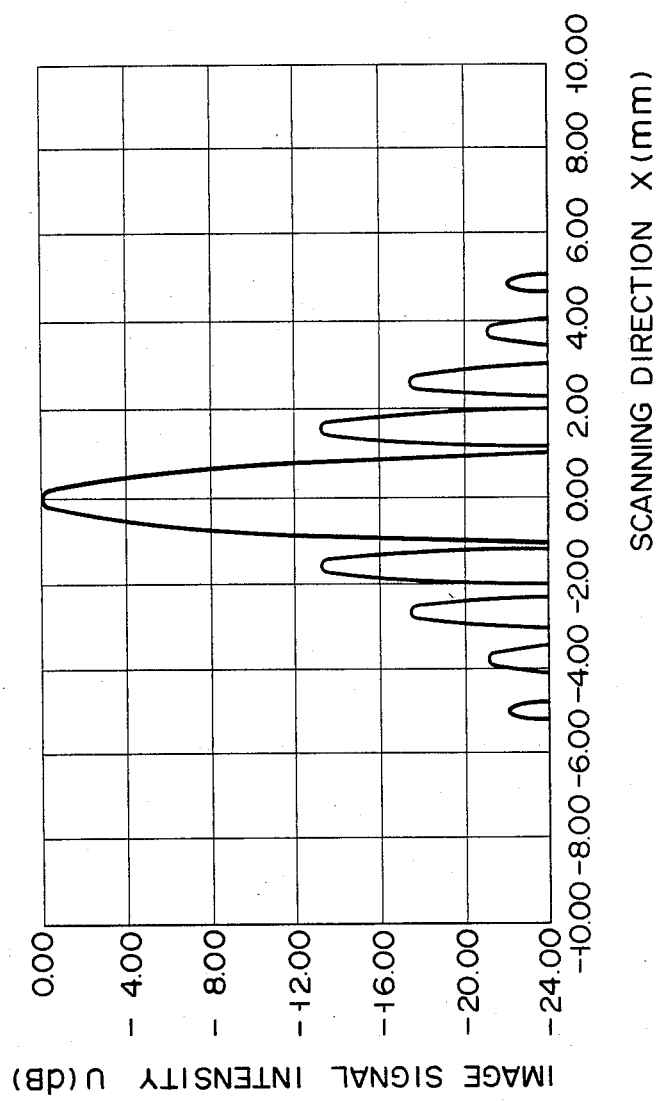

IMAGE SIGNAL-PROCESSING SYSTEM BASED ON SYNTHETIC APERTURE TECHNIQUE

BACKGROUND OF THE INVENTION

This invention relates to an image signal-processing system (hereinafter simply referred to as "an imaging system") based on a synthetic aperture technique, and more particularly to an imaging method and an apparatus therefor which are applied to a synthetic aperture radar or an imaging system effecting the reconstruction of an acoustic image by a synthetic aperture technique.

According to an imaging system based on a synthetic aperture technique which is favorably applied to a radar or acoustic imaging apparatus, a beam of radio wave or acoustic wave is emitted through the space toward a foreground subject in a state progressively expanding at a prescribed angle, to detect an image of the foreground subject from the radio or acoustic waves reflected from the foreground subject. The above-mentioned imaging system which assures substantially constant image-resolving capacity regardless of a distance between a foreground subject and an imaging system (hereinafter referred to as "the depth of a foreground subject") is regarded as one of the most effective means proposed in this particular technical field.

One of the conventional imaging system utilizing an ultrasonic beam involves a transducer radiating an ultrasonic beam which is horizontally movable and vertically expansible at a prescribed angle. When a foreground subject (regarded as a spot reflector for convenience of description) is perpendicularly spaced from the beam-ejecting end of the transducer, the spot reflector is horizontally scanned by an ultrasonic wave. A reflection from the spot reflector received by the transducer is converted into an electric signal, which in turn is supplied to a phase detector. The phase detector detects the phase of the electric signal to produce an analog hologram signal. After being digitized, the hologram signal is stored in a corresponding buffer memory.

The image of a spot reflector is reconstructed by the integration of a hologram signal and the corresponding kernel function. A cosine (cos) hologram signal involved in the hologram signals of the spot reflector contains cos waves which are included in an imaginary envelope wave shaped like the cross section of a convex lens, touching the periphery of the envelope wave with different periods. Therefore, the cos hologram signal indicates a striped pattern consisting of a plurality of stripes which are rendered broader toward the center of the pattern and narrower toward both ends thereof. Now assume that among n rows of the data of the cos hologram signal, the first row of data are represented by $H_1, H_2, \ldots H_m$ (m: position integer), and data on the corresponding kernel functions are denoted by $k_1, k_2 \ldots k_n$ (assuring n<m). Then the product $I_1$ of an integration of the H and K forms is competed in a manner indicated by the following equation:

$$I_1 = H_1 \cdot K_1 + H_2 \cdot K_2 + \ldots H_m \cdot K_m$$

The result of integration of data stored in the first row of the data is stored in a first row memory area. Integration is carried out in the same manner as described with respect to the data $I_2 \ldots I_n$ involving the second to the nth rows. The results of the integration are stored in the memory areas corresponding to the second to the nth rows. The above data-processing method is also applied to other hologram signal such as sine (sin) hologram signals. An image signal of the spot reflector is obtained by synthesizing the results of processing data on the pologram signals. An image signal thus obtained comprises a main lobe projecting broadly at the center and a plurality of narrow side lobes continuously extending in opposite directions from both sides of the main lobe. For the reconstruction of the spot reflector image with a distinct contrast and at a high resolution rate, the best method is to reduce the difference between the amplitudes of the main lobe and particularly a first side lobe immediately adjacent to the main lobe as much as possible and also to decrease the width of the main lobe at a prescribed decibel level (namely, increase the sharpness Q of the main lobe) to the greatest possible extent. With the conventional image signal-processing system, the amplitude of the first side lobe has a theorical ratio of about −13 dB at best to that of the main lobe. Further, let it be assumed that the image-resolving power is defined to mean the width of the main lobe at a level of −10 dB; the depth Z of the spot reflector (the perpendicular distance of the reflector from the transducer) indicates 15 mm; and an ultrasonic beam at said depth Z has a width of 75 mm. Thus the resolving power of the conventional signal-processing device is only about 1.6 mm. Therefore, elevating the resolving power of the conventional signal-processing device is required.

SUMMARY OF THE INVENTION

It is accordingly the object of this invention to provide a new and improved image signal-processing apparatus and method therefor which produces the reconstruction of a high quality image from an image signal produced by a synthetic aperture technique.

To attain the above-mentioned object, this invention provides a signal-processing apparatus, wherein, when radiation is emitted to a foreground subject, the phase detection of the corresponding reflection is effected to take out the perpendicularly intersecting signal component of the reflection. The resultant hologram signal is applied to reconstruct the foreground subject through the synthetic aperture technique. Prior to the image reconstruction, the amplitude of the hologram signal is compressed by a first nonlinear processing. A convolution integration is carried out between the hologram signal and kernel function to produce a reconstructed image signal. The amplitude of the reconstructed image signal is then expanded by a second nonlinear processing as the inverse operation of the first nonlinear processing.

BRIEF DESCRIPTION OF THE DRAWINGS

The present invention is best understood by reference to the accompanying drawings, in which:

FIG. 4 is a graph illustrating a waveform of the reconstructed image of a spot reflector obtained by a prescribed integration, that is, a convolution integration between a hologram signal whose amplitude is subjected to square root compression, which is one of nonlinear processing, and data on the corresponding kernel function; and FIG. 5 is a graph showing the waveform of an image reconstructed from a standard hologram which is not subjected to the above-mentioned nonlinear processing embodying this invention (for example, the square root compression).

DETAILED DESCRIPTION OF THE PREFERRED EMBODIMENT

Figure 1:
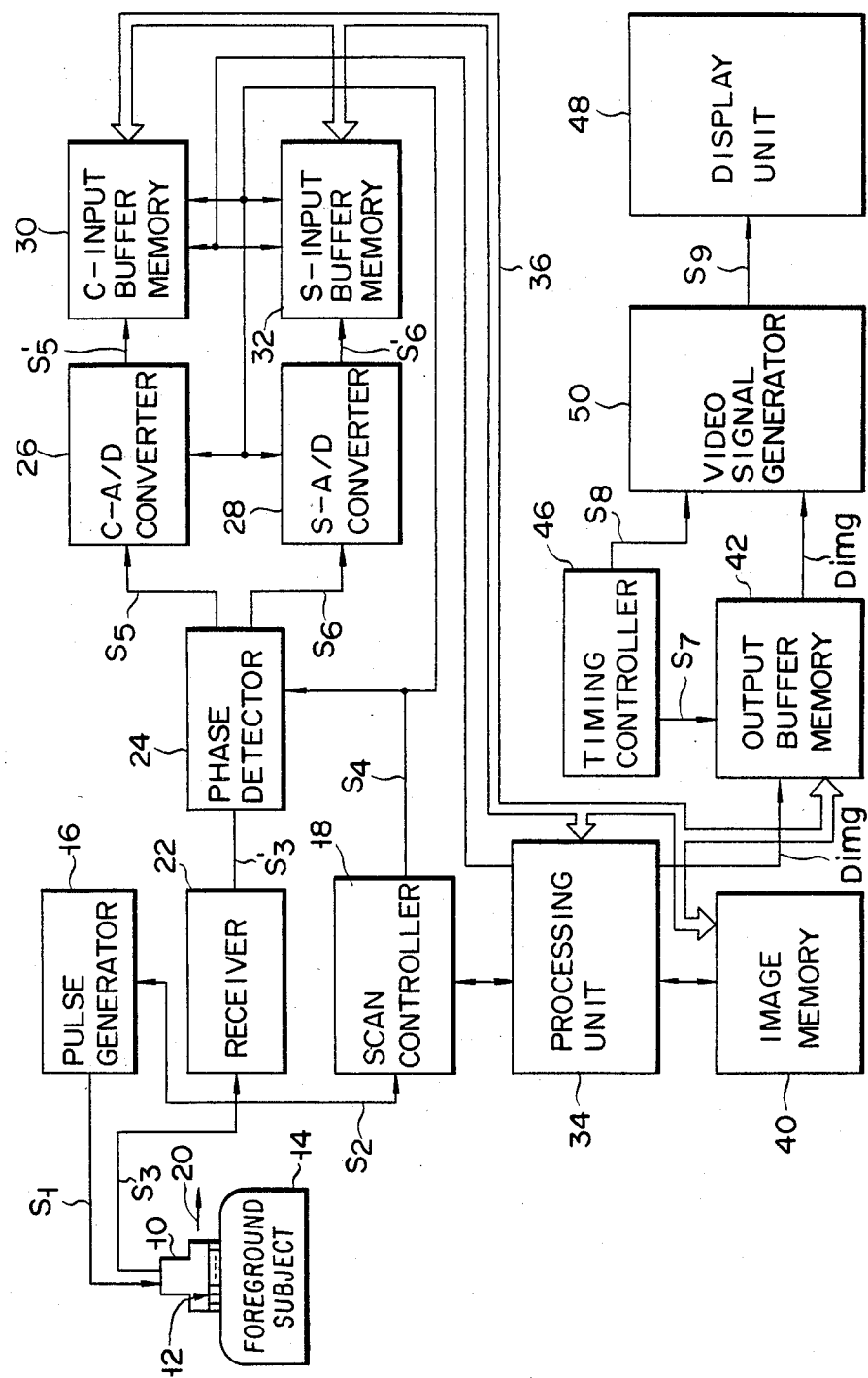
FIG. 1 is a block circuit diagram of the whole of an ultrasonic computed tomography system involving an image signal-processing apparatus embodying this invention.

Referring now to FIG. 1 showing the block circuit diagram of an ultrasonic computed tomographic system involving an image signal-processing apparatus embodying this invention, an ultrasonic probe 10 comprises a transducer array unit 12 consisting of a plulrality of transducer elements. Each of the transducer elements radiates an ultrasonic beam expanding through the space at a prescribed angle toward a foreground subject, for example, a human body 14. A reflection (echo wave) sent back from that portion of the human body 14 in which an ultrasonic beam was previously irradiated is received by the same transducer that emitted the ultrasonic beam. The received ultrasonic beams are converted into an electric signal. In the foregoing embodiment, the transducer 12 is chosen to have a resonance frequency $f_r$ generally ranging between 2 and 10 MHz.

Figure 2:
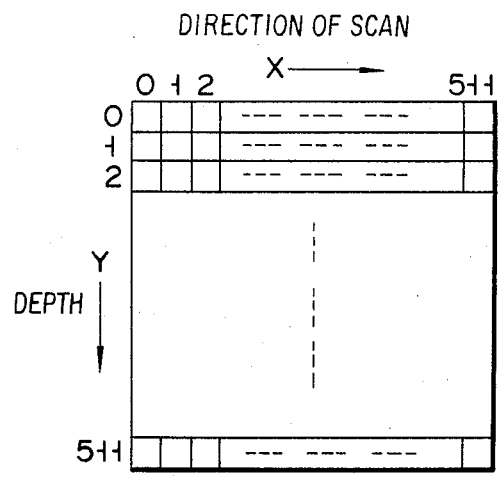
FIG. 2 indicates the image memory addresses provided in the ultrasonic diagnostic system of FIG. 1.

A pulse generator 16 successively applies a drive pulse signal $S_1$ to those of the transducers 12 provided in the probe 10 which are specified by a scan controller 18 upon receipt of a control pulse signal from a scan controller 18, in order to effect the drive of the specified transducers 12. As a result, the specified transducers 12 emit multiple ultrasonic beams to the human body 14 in a prescribed period, thereby enabling the human body 14 to be scanned substantially in the direction of an arrow 20 (FIG. 1) which corresponds to the direction of x (FIG. 2).

An electric detection signal $S_3$ corresponding to an echo wave received by the transducer 12 of the probe 10 is supplied to a receiver 22 to be amplified to a required level. A phase detector 24 following the receiver 22 receives an amplified signal from the receiver 22 and a signal $S_4$ involving two sine waves from a scan controller 18, thereby carrying out the phase detection of both signals by their integration. The above-mentioned two sine (sin) waves are chosen to have a frequency conforming to the resonance frequency $f_r$ of the transducer 12. In accordance with the result of the phase detection, the phase detector 24 delivers two hologram signals, that is, a cosine (cos) hologram signal $S_5$ and sine hologram signal $S_6$ to first and second analog to digital (A/D) converters 26, 28 following the phase detector 24. Hereinafter, the first and second A/D converters 26, 28 are respectively referred to as "C-A/D converter and S-A/D converters" in conformity to cos and sin hologram signals. The C-A/D and S-A/D converters 26, 28 sample the aforesaid cos and sin hologram signals $S_5$, $S_6$ and digitize them (for example, into 8 bits) and respectively generate digital hologram signals $S_5'$ and $S_6'$. A sampling pitch is determined in accordance with the duration of a detection signal $S_3$ representing an echo wave from, for example, a reflector portion (not shown) of the foreground subject or human body 14. When the detection signal $S_3$ is assumed to have a duration of 2 $\mu$sec, the sampling pitch should be set at about one-fifth of the duration, namely, 400 n sec. A sampling clock involved in a signal $S_4$ supplied from the scan controller 18 acts as an important parameter in the determination of the sampling pitch. Sampling and A/D convertion undertaken by the A/D converters 26, 28 are carried out in synchronism with a sampling clock signal.

The aforementioned 8 bit-digitized hologram signals $S_5'$, $S_6'$ are respectively stored in the corresponding first and second input buffer memories (C- and S-input buffer memories) 30, 32. Writing of data in the buffer memories 30, 32 is also effected upon receipt of a sampling clock signal from the scan controller 18. Both hologram signals $S_5'$, $S_6'$ thus sampled are respectively stored in the corresponding buffer memories 30, 32. The buffer memories 30, 32 respectively have a sufficient memory capacity to store at one time a series of echo signals obtained from a single ultrasonic pulse emitted from the transducer 12. Hologram data stored in the buffer memories 30, 32 are read out under control of a processing unit 34 which comprises a computer and is connected to said buffer memories 30, 32 through a data bus 36.

The processing unit 34 comprises ROM (not shown) which previously stores the kernel function data based on the synthetic aperture method, and is also connected to an image memory 40 which can simultaneously store image data corresponding to, for example, two image pictures. Consequently, the image memory 40 can store at once two cos- and sin-hologram data read out of the buffer memories 30, 32 through the data bus 36 under the control of the processing unit 34. The image memory 40 has a memory area depicted by FIG. 2. The X and Y addresses of the image memory 40 have a range defined from the zero address to the 511th address, respectively. With the image memory 40 of FIG. 2, the X address direction corresponds to the direction in which the ultrasonic probe 10 carries out scanning, while the Y address direction corresponds to the depth of a foreground subject or human body 14. Each address can store one 8-bit data.

An output buffer memory 42 connected to the image memory 40 through the data bus 36 stores data on an image reconstructed by the later described special operation of the processing unit 34. The buffer memory 42 always reads out data stored in the image memory 40 in synchronism with the timing control signal $S_f$ from the timing controller 46 connected thereto and under the control of the processing unit 34, and then stores the data therein. The data reading from the image memory 40 is obviously undertaken in conformity with the image scanning method of a display unit such as CRT 48 provided in the last stage of the ultrasonic computed tomography system.

A timing controller 46 performs two actions, namely, the control of data reading for the indication on a display unit 48 of an image data to be stored in the output buffer memory 42 and the generation of a TV synchronizing signal $S_8$ to be supplied to the display unit 48. Therefore, reconstructed image data $D_{img}$ delivered from the output buffer memory 42 is subjected to digital/analog conversion by a D/A converter (not shown) included in a video signal generator 50 and then mixed with the above-mentioned TV synchronizing signal $S_8$ to produce a composite video signal $S_9$, which is later supplied to the display unit 48. Thus, a reconstructed image appears on the display unit 48.

The processing unit 34 performs three main actions, namely, the control of the scan controller 18, the control of the transmission of hologram data and the reconstruction of the image of a foreground subject. The reconstruction of an image involves the steps of compressing the amplitude of a hologram signal, carrying out the convolution integration by the synthetic aperture technique, and expanding the amplitude of the resultant image signal. The nonlinear compression of the amplitude of a hologram signal and the nonlinear expansion of the amplitude of an image signal which are respectively carried out before and after an operation by the synthetic aperture method are the unique features of this invention as hereinafter detailed.

The control action of the scan controller 18 will be described first. After completion of data reading from the C-input buffer memory 30 and S-input buffer memory 32, the processing unit 34 instructs the scan controller 18 to emit an ultrasonic beam and also specifies a transducer element 12 to be energized. Under the control of the processing unit 34, the scan controller 18 causes the pulse generator 16 to properly drive the specified oscillator.

Cos hologram data $S_5$ and sin hologram data $S_6$ resulting from the emission of one dose of ultrasonic beams to the foreground subject 14 are respectively stored in buffer memories 30, 32 under the control of the processing unit 34. Thereafter, the processing unit 34 causes the hologram data $S_5$, $S_6$ to be successively read out of the corresponding C-input buffer memory 30 and S-input buffer memory 32. The data thus read out are delivered to the image memory 40 through the data bus 36, and stored in those addresses of the image memory 40 which are designated in accordance with the position of that transducer 12 which emits an ultrasonic beam and the depth of the foreground subject 14. A data map stored in the image memory 40 in the form of an X-Y coordinate system is indicated in FIG. 2. The X ordinate represents the scanning direction 20 of the probe 20, and the Y ordinate denotes the depth of the foreground subject 14.

The reconstruction processing of an image is started after all the transducers 12 invalved in the ultrasonic probe 20 are driven to emit an ultrasonic beam, and all the hologram signals resulting from the emission of an ultrasonic beam from all the transducers are stored in the image memory 40. The reading of data is carried out by accessing the image memory 40 of FIG. 2, in accordance with the X-Y memory addresses, (that is, from the small to the greater depth of the foreground subject). Therefore, a hologram data delivered to the processing unit 34 is data of one row headed by data stored in the address (0, 0) of the image memory 40. According to this embodiment, for example, the square root completion is utilized as the non-linear completion processing of the hologram signal amplitude which is to be performed before the processing unit 34 carries out the convolution integration of the kernel function data prestored in the ROM included in the processing unit 34 and the hologram data. Now let it be assumed that an ultrasonic beam emitted from the transducer 12 of the probe 10 is represented by $$P_r(t) \cos \omega t$$

where,
ω: carrier frequency (rad/sec) of an ultrasonic wave
t: time ($0 \leq t \leq T$)
T: period Then the corresponding received signal R(x, t) is expressed by the following equation:

$$R(x, t) = k \cdot P_T\left(t - \frac{2L}{V}\right) \cdot \cos \omega \left(t - \frac{2L}{V}\right) \quad (1)$$

where:
V: second velocity (m/sec) from the foreground subject 14
λ: wavelength (mm)
L: distance between the transducer and spot reflector
k: ratio constant
The distance L may be further expressed as follows:

$$L = \sqrt{Z^2 + x^2} \simeq z + \frac{x^2}{2z} \quad (2)$$

where,
x: an ordinate denoting the direction in which scanning 20 is carried out
z: an ordinate representing the depth of the foreground subject 14.

From the above equations (1) and (2), the detection signal $S_3'$, which is transferred from the receiver 22 to the phase detector, is represented by the following equation:

$$R(x, t) = R \cdot P_T\left(t - \frac{2L}{V}\right) \cdot \cos \omega \left\{t - \frac{2}{V}\left(z + \frac{x^2}{2z}\right)\right\} \quad (3)$$

Two hologram signals $S_5$, $S_6$ obtained after the signal $S_3'$ is phase-detected by the phase detector 24 are respectively expressed by the following equation:

$$R_C(x, t) = k \cdot P_T\left(t - \frac{2L}{V}\right) \cdot \cos\left(\frac{\omega}{V_z} x^2 + \frac{2\omega z}{V}\right) \quad (4)$$

$$R_S(x, t) = k \cdot P_T\left(t - \frac{2L}{V}\right) \cdot \sin\left(\frac{\omega}{V_z} x^2 + \frac{2\omega z}{V}\right) \quad (5)$$

When the equations (4) and (5) are subjected to complex-combination, assuming for briefness (exerting no practical harmful effect)

$$A = \frac{\omega}{V_z}$$

$$B = \frac{2\omega z}{V}$$

$$k \cdot P_T\left(t - \frac{2L}{V}\right) = 1$$

then the following equation results:

$$\begin{aligned} R_{CM} &= R_C - jR_S \\ &= \exp[-j(Ax^2 + B)] \end{aligned} \quad (6)$$

The above $R_{CM}$ is simply referred to as "a hologram" hereinafter.

Now, assuming that a hologram subjected to square root compression is represented by $T\{R_{CM}\}$, the following equation results:

$$T\{R_{CM}\} = \sqrt{|\cos(Ax^2 + B)|} \cdot Sgn\{\cos(Ax^2 + B)\} - \quad (7)$$
$$j\sqrt{|\sin(Ax^2 + B)|} \cdot Sgn\{\sin(Ax^2 + B)\}$$

Figure 3:
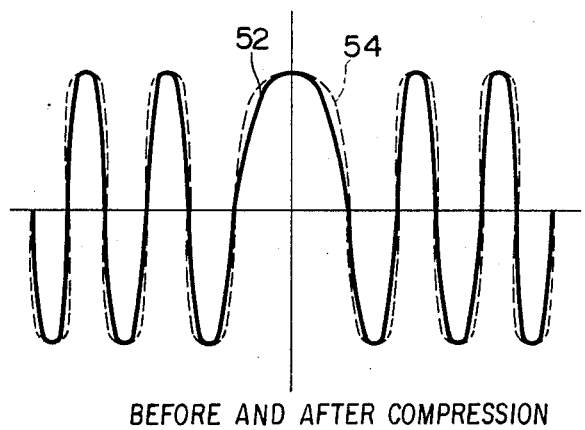
FIG. 3 indicates the waveform of a hologram signal stored in the image memory of FIG. 2 when subjected to the square root compression.

It should be noted that in practice, cos and sin hologram data corresponding to one row which have been read out of the image memory 40 are first subjected to square root compression and then to complex combination. FIG. 3 graphically distinctly shows the waveforms appearing before and after the square root compression. In FIG. 3, the waveform of, for example, a cos hologram signal is denoted by a solid line 52, while the waveform of the corresponding signal subjected to the square root compression is represented by a broken curve 54. It will be noted that in FIG. 3, the two waveforms are indicated with 1 taken as a maximum value.

Subsequently, the processing unit 34 causes the kernel function data to be read out of the ROM involved therein and carries the convolution integration of the kernel function data and the above-mentioned compressed hologram $T\{R_{CM}\}$. In this case, the kernel function C corresponds to a hologram expressed by the equation (6) and is expressed by a complex member (conjugate complex number) bearing a complex conjugate relation to the hologram. Therefore, the kernel function C may be expressed is follows:

$$C = \exp[jAx^2] \quad (8)$$

consequently the convolution integration $U_S$ for the image reconstruction is expressed as follows:

$$U_S = \int_{-\infty}^{\infty} rect\left(\frac{x}{D}\right) \cdot T\{R_{CM}\} \cdot \exp\{jA(X - x)^2\} \cdot dx \quad (9)$$

where,
rect (x/D): rect function which indicates 1 with the range of $|x| \leq D/2$, and 0 in the other range
D: width of an ultrasonic beam at a given depth z within the foreground subject 14

FIG. 4 shows the result of computing the value of the above-mentioned equation (9) by use of a computer. In this case, the numerical computation occurred under the conditions, wherein frequency is 3.5 MHz, sound velocity is 1540 m/sec, z=75 mm and D=15 mm.

FIG. 5 indicates the result of the standard convolution integration which was carried out when the hologram compression embodying this invention was not undertaken and was computed under the same conditions described above.

$$U = \int_{-\infty}^{\infty} rect\left(\frac{x}{D}\right) \cdot \exp[-j(Ax^2 + B)] - \quad (10)$$
$$\exp[jA(X - x)^2] \cdot dx$$

The patterns of FIGS. 4 and 5 appear to be similar to each other except that the fourth side lobes have different amplitudes. Therefore, if may be safely said that even when a hologram is subjected to the square root compression, no substantial decline appears in the side lobe level and resolution capacity. Therefore, the improvement of the side lobe level and resolution capacity in amplitude expansion represents the elevations of the two factors when subjected to a nonlinaear treatment without any modification. In other words, the side lobe level is about doubled as measured by dB, and the resolution capacity is raised about 25%. The following fact proves that the amplitude ratio is maintained by the square root compression of a hologram, when subjected to the square root compression, a hologram ($R_{CM}' = K \cdot \exp[-j(Ax^2+B)]$) having an amplitude K ($K \geq 0$) may be expressed as follows, of the term $R_{CM}$ of the equation (3) is replaced by $R_{CM}'$:

$$T\{R'_{CM}\} = T\{K \cdot R_{CM}\} = \sqrt{K} \cdot T\{R_{CM}\} \quad (11)$$

When the term $T\{R_{CM}\}$ of the equation (9) is replaced by $T\{R_{CM}\} = \sqrt{K} \cdot T\{R_{CM}\}$, the convolution integration $U_S'$ is expressed as follows:

$$U_{S'} = \sqrt{K} \cdot U_S \quad (12)$$

An ultimate image which is obtained by the square expansion of the above absolute value is expressed as follows:

$$|U_{S'}|^2 = K|U_S|^2 \quad (13)$$

The equation (13) indicates that when a nonlinear treatment is carried out in accordance with the present invention, a reconstructed image has an amplitude proportional to the amplitude K of a hologram.

The processing unit 34 carries out the square root expansion of the value of the result of the convolution integration as the nonlinear processing, thereby producing a final reconstructed image as seen from the above equation (13). Data on the reconstructed image is stored in the output buffer memory 42. The above-mentioned continuous cycle of treatments is repeated, each time data is read out of the image memory 40. In the embodiment of this invention, the processing steps are successively repeated until all required hologram data are readout of the X-Y addresses (511, 511) of the image memory 40. After the completion of the arithmetic operation of all the hologram data, final image data $D_{img}$ stored in the output buffer memory 42 are supplied to the display unit 48 through the video signal generator 50 with D/A converter included therein to be displayed on the display unit 48.

According to the present invention, the signal amplitude compression and signal amplitude expansion are carried out, as nonlinear processings or treatments, before and after the image of a foreground subject is reconstructed by the convolution integration based on the synthetic aperture method. In other words, the amplitude of a hologram signal is nonlinearly compressed before the reconstruction of the image. Convolution integration of the kernel function data and the hologram signal whose amplitude has been compressed is carried out. Thereafter, the amplitude of a reconstructed image signal corresponding to the result of the above convolution integration is nonlinearly expanded. In this case, improvement of the side lobe level of an image signal and/or the resolution capacity of the image signal-processing apparatus more than cover a decline in the side lobe level of an image signal and/or the resolution capacity resulting from the compression of the amplitude of a hologram signal. Therefore, according to this invention, both the side lobe level and the resolution capacity of the image signal-processing apparatus can be improved by performing the above-mentioned nonlinear processings to provide the easy reconstruction of a high quality image. As numerically expressed, the side lobe level is almost doubled in terms of dB, and the resolution capacity of said device is improved about 25%.

Further, this invention offers an unexpected advantage. When the aforementioned nonlinear square root compression and square expansion processings performed before and after the reconstruction of an image signal are each replaced by a logarithmic compression and an exponential expansion, then the exponential expansion can be omitted in the later stage of the signal-processing cycle, thereby significantly reducing the signal processing time of the processing unit 34. The importance of this advantage is discussed below. As is well known to those skilled in the art, a logarithmic compression of an image signal to be displayed is required, whether or not the nonlinear processing of a signal embodying this invention is undertaken. If, therefore, the nonlinear logarithmic compression and exponential function expansion are respectively added before and after the image reconstruction process under the above-mentioned condition, the nonlinear exponential function expansion and the logarithmic compression for the image display offset each other, since these processings have a relation of inverse calculation to each other. Consequently it is possible to omit these processings from the computing operation of the processing unit 34. Further, if the nonlinear compression for the image display is realized by a square root compression, and if the square root compression and square expansion are performed as the nonlinear processings before and after the image reconstruction process, that portion of the amplitude of an image signal which is subjected to square expansion can apparently be omitted.

Although the present invention has been shown and described with respect to a particular embodiment, various changes and modifications which are obvious to a person skilled in the art to which the invention pertains are possible.

In the foregoing embodiment, the nonlinear square root compression of the amplitude of an image signal and the nonlinear square expansion of the aforementioned amplitude were carried out. If, however, improvement on the side lobe level and resolution capacity in the square expansion is more than the decline in the above-said two factors from the square root compression, it is possible to combine various kinds of processes of nonlinearly treating the amplitude of an image signal. It is possible to cite, for example, a combination of the cubic root compression-cube expansion, logarithmic compression-exponential function expansion and 1/1.5 multiplication-1.5 times multiplication.

An ultrasonic image is often displayed after the amplitude of the signal thereof is subjected to logarithmic compression in order to broaden a dynamic range. In such cases, the image signal-processing method of this invention may be modified by adding the logarithmic compression of the amplitude of an image signal intended for the display of the above image signal, after the aforementioned nonlinear compression and expansion of the amplitude of the image signal have been carried out.

The case where the square root compression and square expansion are performed as the nonlinear signal processings before and after the image reconstruction process, while the logarithmic compression is carried out for the display of image signal on the display unit may be cited as an instance of the above-mentioned modification. The above-mentioned steps of the non-linear square expansion of the amplitude of an image signal and the logarithmic compression of said amplitude for the purpose of display can be taken at the sometime.

In the aforementioned modification of the image signal-processing method of this invention, it sometimes happens that an improvement on the side lobe level and resolution capacity resulting from the nonlinear treatment of the amplitude of an image signal conducted after the convolution integration of a hologram signal is attained to a lesser degree than the decline in said two factors. However, this event is simply an apparent drawback caused by the aforementioned addition of the step of the logarithmic compression for the purpose of display. Obviously, said additional logarithmic compression is included in this invention.

What is claimed is:

1. An apparatus for reconstructing an image signal of a foreground subject on the basis of a synthetic aperture technique which, when a radiation is emitted to the foreground subject, receives a hologram having an amplitude corresponding to a wave reflected from the foreground subject, and reconstructs the image signal of said foreground subject from said hologram signal, comprising:
    (a) first means for compressing the amplitude of said hologram signal as a first nonlinear processing;
    (b) second means for prestoring kernel function data corresponding to said hologram signal in conformity with the synthetic aperture technique, for combining the hologram signal whose amplitude is compressed with the kernel function data, and for performing the convolution integration of a combination of said hologram signal and said kernel function data, thereby producing a reconstructed image signal having an ampltiude; and
    (c) third means for expanding the amplitude of the reconstructed image signal as a second nonlinear processing.

2. The apparatus according to claim 1, wherein said first means carries out a square root compression of the amplitude of the hologram signal, and said third means effects a square expansion of the amplitude of the reconstructed image signal.

3. The apparatus according to claim 1, wherein said first means carries out a logarithmic compression of the amplitude of the hologram signal, and said third means undertakes an exponential expansion of the amplitude of the reconstructed image signal.

4. An image data processing apparatus comprising:
    (a) transducer means for emitting radiation including a radio or acoustic wave to a foreground subject, and for detecting the corresponding radiation reflected from the foreground subject, to convert said reflected radiation into an electrical signal;
    (b) hologram data generating means connected to the transducer means, for generating hologram data representing at least one hologram signal in response to said electrical signal;

(c) first buffer memory means connected to said hologram data generating means, for temporarily storing the hologram data;

(d) computer means for prestoring kernel function data corresponding to the hologram data by a synthetic aperture method, for causing the hologram data to be read out of said first buffer memory means, and for performing the convolution integration of the hologram data and kernel function data to reconstruct the image signal, thereby producing a reconstructed image signal, said computer means performing a first nonlinear processing to compress the amplitude of a hologram signal involved in the hologram data before the reconstruction of an image signal and a second nonlinear processing to expand the amplitude of the reconstructed image signal after the image reconstruction process; and (e) display means connected to the computer means, for displaying the image of the foreground subject represented by the reconstructed image signal.

5. The apparatus according to claim 4, wherein said display means carries out a third nonlinear processing to compress the amplitude of the reconstructed image signal before the foreground subject is displayed.

6. The apparatus according to claim 5, wherein, when a first operation including logarithmic compution is selected for the first and third nonlinear processings, and a second operation involving exponential computation which bears an inverse relationship to the first operation is selected for the second nonlinear processing.

7. The apparatus according to claim 6, wherein said computer means carries out a square root compression as the first nonlinear processing and a square expansion as the second nonlinear processing, while said display means performs the square expansion as the third nonlinear processing.

8. The apparatus according to claim 7, which further comprises image memory means having its memory capacity enough to store all the hologram data read out of said first buffer memory means.

9. The apparatus according to claim 8, which further comprises second buffer memory means for temporarily storing the reconstructed image signal delivered from said computer means and for supplying the reconstructed image signal to said display means.

10. The apparatus according to claim 6, wherein said computer means carries out a logarithmic computation as the first nonlinear processing and exponential function computation as the second nonlinear processing, while said display means performs the logarithmic computation as the third nonlinear processing.

11. The apparatus according to claim 10, which further comprises image memory means having its memory capacity enough to store all the hologram data read out of said first buffer memory means.

12. The apparatus according to claim 11, which further comprises second buffer memory means for temporarily storing the reconstructed image signal delivered from said computer means and for supplying the reconstructed image signal to said display means.

13. A method of processing an image signal by a synthetic aperture method which comprises the steps of:

(a) emitting radiation, including a radio or acoustic wave, to the foreground subject to detect the corresponding radiation reflected from the foreground subject, thereby converting said reflected radiation into an electrical signal;

(b) detecting a perpendicularly intersecting signal component involved in said electric signal to determine its phase to produce hologram data representing at least one hologram signal;

(c) compressing the amplitude of said hologram signal;

(d) carrying out a convolution integration of the hologram data representing the amplitude-compressed hologram signal and the corresponding kernel function data, thereby producing a reconstructed image signal having its waveform including a main lobe and side lobe;

(e) expanding the amplitude of the image signal to reduce the difference between the levels of the main lobe and side lobe of said image signal and to increase the rate of resolving of said image signal; and (f) visibly displaying said image signal.

14. The method according to claim 13, which further comprises the step of compressing the amplitude of the reconstructed image signal for the display of said reconstructed image signal.

15. The method according to claim 14, wherein a first operation including a logarithmic computation is selected in said steps of compressing and expanding the hologram signal, and a second operation inversed from the first operation, including an exponential function computation, is selected in said step of compressing the image signal to be displayed, thereby substantially offsetting the steps of expanding and compressing the image signal.

* * * * *